US012692580B2

(12) United States Patent
Kido et al.

(10) Patent No.: US 12,692,580 B2
(45) Date of Patent: Jul. 28, 2026

(54) CEMENTED CARBIDE

(71) Applicant: Sumitomo Electric Industries, Ltd., Osaka (JP)

(72) Inventors: Yasuki Kido, Osaka (JP); Katsumi Okamura, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 406 days.

(21) Appl. No.: 18/567,021

(22) PCT Filed: Mar. 15, 2022

(86) PCT No.: PCT/JP2022/011623
§ 371 (c)(1),
(2) Date: Dec. 5, 2023

(87) PCT Pub. No.: WO2023/175721
PCT Pub. Date: Sep. 21, 2023

(65) Prior Publication Data
US 2024/0263283 A1 Aug. 8, 2024

(51) Int. Cl.
*C22C 29/08* (2006.01)
*C22C 29/06* (2006.01)
*B23B 27/14* (2006.01)

(52) U.S. Cl.
CPC ............ *C22C 29/08* (2013.01); *C22C 29/067* (2013.01); *B23B 27/14* (2013.01)

(58) Field of Classification Search
CPC ....... C22C 29/08; C22C 29/067; C22C 1/051; B23B 27/14; B22F 2005/001
See application file for complete search history.

(56) References Cited

U.S. PATENT DOCUMENTS 5,166,103 A 11/1992 Krstic

FOREIGN PATENT DOCUMENTS

| JP | 2000-512688 A | 9/2000 |
|----|---------------|--------|
| JP | 2004-238660 A | 8/2004 |
| JP | 2005-068515 A | 3/2005 |
| JP | 2016-098393 A | 5/2016 |
| JP | 2021-110010 A | 8/2021 |
| KR | 10-2012-0086457 A | 8/2012 |
| WO | 97/046497 A1 | 12/1997 |
| WO | 2005-068515 A1 | 3/2005 |

*Primary Examiner* — Jessee R Roe
(74) *Attorney, Agent, or Firm* — XSENSUS LLP

(57) ABSTRACT

A cemented carbide includes a tungsten carbide grain and a binder phase, wherein the cemented carbide includes 80 volume % or more of the tungsten carbide grain and the binder phase in total, the cemented carbide includes 0.1 volume % or more and 20 volume % or less of the binder phase, the tungsten carbide grain is composed of a first region and a second region, each of the first region and the second region includes a first metal element, the first metal element is at least one selected from a group consisting of titanium, niobium, and tantalum, a ratio R1 is 0.70 time or more and less than 1.30 times as large as a ratio R2, the R2 is 2.0% or more and 10.0% or less, and the binder phase includes cobalt.

11 Claims, 2 Drawing Sheets

CEMENTED CARBIDE

CROSS-REFERENCE TO RELATED APPLICATION

The present application is based on PCT filing PCT/JP2022/011623, filed Mar. 15, 2022, the entire contents of which are incorporated herein by reference.

TECHNICAL FIELD

The present disclosure relates to a cemented carbide.

BACKGROUND ART

Conventionally, a cemented carbide including a tungsten carbide (WC) grain and a binder phase including an iron group element (for example, Fe, Co, or Ni) as a main component has been used as a material of a cutting tool (PTL 1 and PTL 2). Properties required for the cutting tool are strength (for example, deflecting strength), toughness (for example, fracture toughness), hardness (for example, Vickers hardness), plastic deformation resistance, wear resistance, and the like.

CITATION LIST

Patent Literature

PTL 1: Japanese Patent Laying-Open No. 2016-098393
PTL 2: Japanese Patent Laying-Open No. 2021-110010

SUMMARY OF INVENTION

A cemented carbide of the present disclosure is a cemented carbide including a tungsten carbide grain and a binder phase, wherein the cemented carbide includes 80 volume % or more of the tungsten carbide grain and the binder phase in total, the cemented carbide includes 0.1 volume % or more and 20 volume % or less of the binder phase, the tungsten carbide grain is composed of a first region and a second region, the first region is a region of 0 nm or more and 50 nm or less from a surface of the tungsten carbide grain, the second region is a portion of the tungsten carbide grain other than the first region, each of the first region and the second region includes a first metal element, the first metal element is at least one selected from a group consisting of titanium, niobium, and tantalum, a ratio $R1$ of the number of atoms of the first metal element to a total of the number of atoms of the first metal element and the number of atoms of a tungsten element in the first region is 0.70 time or more and less than 1.30 times as large as a ratio $R2$ of the number of atoms of the first metal element to a total of the number of atoms of the first metal element and the number of atoms of the tungsten element in the second region, the $R2$ is 2.0% or more and 10.0% or less, and the binder phase includes cobalt.

DETAILED DESCRIPTION

Figure 1:
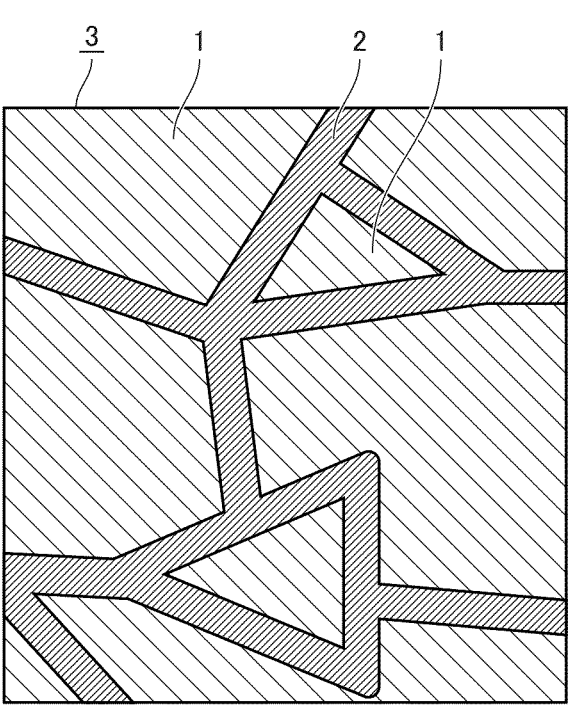
FIG. 1 is a diagram schematically showing a cross section of a cemented carbide according to one embodiment of the present disclosure.

Problem to be Solved by the Present Disclosure

In recent years, a workpiece has become more difficult to be cut in a cutting process, thus resulting in a severe use condition for a cutting tool. For this reason, various properties of a cemented carbide used as a substrate of the cutting tool have been also required to be improved. In particular, in an end milling process (intermittent process) for steel, titanium, Inconel, or the like, a tungsten carbide grain has been required to have excellent toughness (strength) in the cemented carbide in order to attain a long life of the tool.

Advantageous Effect of the Present Disclosure

According to the present disclosure, it is possible to provide a cemented carbide including a tungsten carbide grain having excellent toughness (strength).

Description of Embodiments

First, embodiments of the present disclosure will be listed and described.

(1) A cemented carbide of the present disclosure is a cemented carbide including a tungsten carbide grain and a binder phase, wherein the cemented carbide includes 80 volume % or more of the tungsten carbide grain and the binder phase in total, the cemented carbide includes 0.1 volume % or more and 20 volume % or less of the binder phase, the tungsten carbide grain is composed of a first region and a second region, the first region is a region of 0 nm or more and 50 nm or less from a surface of the tungsten carbide grain, the second region is a portion of the tungsten carbide grain other than the first region, each of the first region and the second region includes a first metal element, the first metal element is at least one selected from a group consisting of titanium, niobium, and tantalum, a ratio $R1$ of the number of atoms of the first metal element to a total of the number of atoms of the first metal element and the number of atoms of a tungsten element in the first region is 0.70 time or more and less than 1.30 times as large as a ratio $R2$ of the number of atoms of the first metal element to a total of the number of atoms of the first metal element and the number of atoms of the tungsten element in the second region, the $R2$ is 2.0% or more and 10.0% or less, and the binder phase includes cobalt.

In the cemented carbide of the present disclosure, the tungsten carbide grain can have excellent toughness (strength).

(2) The $R1$ is preferably 0.75 time or more and 1.25 times or less as large as the $R2$. Thus, more excellent toughness is attained.

(3) The $R2$ is preferably 3.0% or more and 8.0% or less. Thus, more excellent toughness is attained.

(4) The $R1$ is preferably 2.6% or more and 12% or less. Thus, more excellent toughness is attained.

(5) A content ratio of vanadium in the cemented carbide based on the number of atoms is preferably 1.0 atm % or less. Thus, grain boundary strength between tungsten carbide grains can be suppressed from being decreased due to vanadium.

Details of Embodiments of the Present Disclosure

Specific examples of a cemented carbide of one embodiment (hereinafter, also referred to as the present embodiment) of the present disclosure will be described below with reference to figures. In the figures of the present disclosure, the same reference characters represent the same or equivalent portions. Further, a relation of a dimension such as a length, a width, a thickness, or a depth is modified as appropriate for clarity and brevity of the figures and does not necessarily represent an actual dimensional relation.

In the present specification, the expression "A to B" represents a range of lower to upper limits (i.e., A or more and B or less), and when no unit is indicated for A and a unit is indicated only for B, the unit of A is the same as the unit of B.

When a compound or the like is expressed by a chemical formula in the present specification and an atomic ratio is not particularly limited, it is assumed that all the conventionally known atomic ratios are included, and the atomic ratio should not be necessarily limited only to one in the stoichiometric range. For example, when "WC" is described, the atomic ratio of WC includes all the conventionally known atomic ratios.

First Embodiment: Cemented Carbide

As shown in FIG. 1, a cemented carbide according to the present embodiment is as follows:

A cemented carbide 3 including tungsten carbide grains 1 and a binder phase 2, wherein cemented carbide 3 includes 80 volume % or more of tungsten carbide grains 1 and binder phase 2 in total, cemented carbide 3 includes 0.1 volume % or more and 20 volume % or less of binder phase 2, each of tungsten carbide grains 1 is composed of a first region and a second region, the first region is a region of 0 nm or more and 50 nm or less from a surface of tungsten carbide grain 1, the second region is a portion of the tungsten carbide grain other than the first region, each of the first region and the second region includes a first metal element, the first metal element is at least one selected from a group consisting of titanium, niobium, and tantalum, a ratio R1 of the number of atoms of the first metal element to a total of the number of atoms of the first metal element and the number of atoms of a tungsten element in the first region is 0.70 time or more and less than 1.30 times as large as a ratio R2 of the number of atoms of the first metal element to a total of the number of atoms of the first metal element and the number of atoms of the tungsten element in the second region, R2 is 2.0% or more and 10.0% or less, and binder phase 2 includes cobalt.

In cemented carbide 3 of the present embodiment, the tungsten carbide grains can each have excellent toughness (strength). A reason therefor is presumed as follows.

Ratio R1 of the number of atoms of the first metal element to the total of the number of atoms of the first metal element and the number of atoms of the tungsten element in the first region is 0.70 time or more and less than 1.30 times as large as ratio R2 of the number of atoms of the first metal element to the total of the number of atoms of the first metal element and the number of atoms of the tungsten element in the second region, and R2 is 2.0% or more and 10.0% or less. Thus, since the first metal element is appropriately included in a surface region (first region) and an inner region (second region) in each tungsten carbide grain 1, a lattice strain is generated in tungsten carbide grain 1. As a result, the toughness (strength) of tungsten carbide grain 1 can be increased by the lattice strain.

<Composition of Cemented Carbide>

The cemented carbide of the present embodiment is the cemented carbide including the tungsten carbide grains and the binder phase. The cemented carbide includes 80 volume % or more of the tungsten carbide grains and the binder phase in total. With these, the cemented carbide of the present embodiment can have excellent toughness. The cemented carbide includes preferably 82 volume % or more, more preferably 84 volume % or more, and further preferably 86 volume % or more of the tungsten carbide grains and the binder phase in total. The cemented carbide preferably includes 100 volume % or less of the tungsten carbide grains and the binder phase in total. It should be noted that from the viewpoint of manufacturing, the cemented carbide can include 98 volume % or less or 99 volume % or less of the tungsten carbide grains and the binder phase in total. The cemented carbide includes preferably 80 volume % or more and 100 volume % or less, more preferably 82 volume % or more and 100 volume % or less, and further preferably 84 volume % or more and 100 volume % or less of the tungsten carbide grains and the binder phase in total.

The cemented carbide of the present embodiment can be composed of the tungsten carbide grains and the binder phase. The cemented carbide of the present embodiment can include not only the tungsten carbide grains and the binder phase but also a phase other than the tungsten carbide grains and the binder phase. Examples of the other phase include carbides or nitrides of titanium (Ti), tantalum (Ta), niobium (Nb), and the like. The cemented carbide of the present embodiment can be composed of the tungsten carbide grains, the binder phase, and the other phase. A permitted content ratio of the other phase of the cemented carbide is in such a range that the effect of the present disclosure is not impaired. For example, the content ratio of the other phase of the cemented carbide is preferably 0 volume % or more and 20 volume % or less, is more preferably 0 volume % or more and 18 volume % or less, and is further preferably 0 volume % or more and 16 volume % or less.

The cemented carbide of the present embodiment can include an impurity. Examples of the impurity include iron (Fe), molybdenum (Mo), calcium (Ca), silicon (Si), and sulfur (S). A permitted content ratio of the impurity of the cemented carbide is in such a range that the effect of the present disclosure is not impaired. For example, the content ratio of the impurity in the cemented carbide is preferably 0 mass % or more and less than 0.1 mass %. The content ratio of the impurity of the cemented carbide is measured by ICP emission spectroscopy (Inductively Coupled Plasma Emission Spectroscopy (measurement device: ICPS-8100 (trademark) provided by Shimadzu Corporation).

The lower limit of the content ratio of the tungsten carbide grains in the cemented carbide of the present embodiment is preferably 60 volume % or more, 62 volume % or more, or 64 volume % or more. The upper limit of the content ratio of tungsten carbide grains in the cemented carbide of the present embodiment is preferably 99.9 volume % or less, 99 volume % or less, or 98 volume % or less. The content ratio of the tungsten carbide grains in the cemented carbide of the present embodiment is preferably 60 volume % or more and 99.9 volume % or less, 62 volume % or more and 99 volume % or less, or 64 volume % or more and 98 volume % or less.

The cemented carbide of the present embodiment includes 0.1 volume % or more and 20 volume % or less of the binder phase. Thus, the cemented carbide of the present embodiment can have excellent toughness. The cemented carbide includes preferably 1 volume % or more, more preferably 2 volume % or more, and further preferably 3 volume % or more of the binder phase. The cemented carbide includes preferably 18 volume % or less, more preferably 16 volume % or less, and further preferably 14 volume % or less of the binder phase. Further, the cemented carbide includes preferably 1 volume % or more and 18 volume % or less, more preferably 2 volume % or more and 16 volume % or less, and further preferably 3 volume % or more and 14 volume % or less of the binder phase.

The cemented carbide of the present embodiment is preferably composed of 60 volume % or more and 99.9 volume % or less of the tungsten carbide grains and 0.1 volume % or more and 20 volume % or less of the binder phase. The cemented carbide of the present embodiment is preferably composed of 62 volume % or more and 99 volume % or less of the tungsten carbide grains and 1 volume % or more and 18 volume % or less of the binder phase. The cemented carbide of the present embodiment is preferably composed of 64 volume % or more and 98 volume % or less of the tungsten carbide grains and 2 volume % or more and 16 volume % or less of the binder phase.

A method of measuring each of the content ratio (volume %) of the tungsten carbide grains of the cemented carbide and the content ratio (volume %) of the binder phase of the cemented carbide is as follows.

(A1) The cemented carbide is cut at an arbitrary position to expose a cross section. The cross section is mirror-finished by a cross section polisher (provided by JEOL).

(B1) The mirror-finished surface of the cemented carbide is subjected to an analysis using scanning electron microscope-energy dispersive X-ray spectroscopy (SEM-EDX) (device: Gemini450 (trademark) provided by Carl Zeiss) so as to specify elements included in the cemented carbide.

(C1) An image of the mirror-finished surface of the cemented carbide is captured using a scanning electron microscope (SEM), thereby obtaining a reflected electron image. A region to be captured in the image is set at a position that does not include a central portion of the cross section of the cemented carbide, i.e., a portion apparently different in properties from a bulk portion such as a vicinity of the surface of the cemented carbide (position at which the whole of the region to be captured in the image is the bulk portion of the cemented carbide). An observation magnification was 5,000×. Measurement conditions are as follows: an acceleration voltage of 3 kV; a current value of 2 nA; and a working distance (WD) of 5 mm.

(D1) An energy dispersive X-ray spectroscopic device (SEM-EDX) accompanied with the SEM is used to perform an analysis onto the region captured in the image in (C1) so as to specify distributions of the elements specified in (B1) in the region captured in the image, thereby obtaining an element mapping image.

(E1) The reflected electron image obtained in (C1) is loaded into a computer, and is subjected to a binarization process using image analysis software (OpenCV, SciPy). In the image having been through the binarization process, the tungsten carbide grains are shown in white and the binder phase is shown in gray to black. It should be noted that since a threshold value for the binarization is changed depending on contrast, the threshold value is set for each image.

(F1) The element mapping image obtained in (D1) and the image having been through the binarization process and obtained in (E1) are superimposed on each other, thereby specifying a region with existence of the tungsten carbide grains and a region with existence of the binder phase on the image having been through the binarization process. Specifically, the region with existence of the tungsten carbide grains corresponds to a region which is shown in white in the image having been through the binarization process and in which tungsten (W) and carbon (C) exist in the element mapping image. The region with existence of the binder phase corresponds to a region which is shown in gray to black in the image having been through the binarization process and in which cobalt (Co) exists in the element mapping image.

(G1) One measurement visual field having a quadrangular shape of 24.9 μm×18.8 μm is set in the image having been through the binarization process. The above-described image analysis software is used to measure each of the area percentage of the tungsten carbide grains and the area percentage of the binder phase with the area of the entire measurement visual field being used as a denominator.

(H1) The measurement of (G1) is performed in five different measurement visual fields that do not overlap with one another. In the present specification, the average of the area percentages of the tungsten carbide grains in the five measurement visual fields corresponds to the content ratio (volume %) of the tungsten carbide grains of the cemented carbide, and the average of the area percentages of the binder phase in the five measurement visual fields corresponds to the content ratio (volume %) of the binder phase of the cemented carbide.

When the cemented carbide includes the other phase in addition to the WC grains and the binder phase, the content ratio of the other phase of the cemented carbide can be obtained by subtracting, from the whole (100 volume %) of the cemented carbide, the content ratio (volume %) of the tungsten carbide grains and the content ratio (volume %) of the binder phase each measured in the above-described procedure.

In the measurement performed by the applicant, as long as the measurement is performed onto the same sample, it has been confirmed that: variation is small in measurement results even when the position at which the cemented carbide is cut to obtain the cross section is set arbitrarily, the region to be captured in the image as described above in (C1) is set arbitrarily on the cross section, and the content ratio of the tungsten carbide grains and the content ratio of the binder phase in the cemented carbide are measured multiple times in accordance with the above-described procedure;

and the measurement results are not intentional even when the position at which the cemented carbide is cut to obtain the cross section is arbitrarily set and the region to be captured in the reflected electron image is arbitrarily set.

<<Tungsten Carbide Grains>>

Each of the tungsten carbide grains is composed of the first region and the second region. The first region is a region of 0 nm or more and 50 nm or less from the surface of the tungsten carbide grain. The second region is a portion of the tungsten carbide grain other than the first region.

(First Metal Element)

Each of the first region and the second region includes the first metal element, and the first metal element is at least one selected from the group consisting of titanium, niobium, and tantalum. The first metal element is preferably titanium from the viewpoint of providing high toughness (strength) to the tungsten carbide grain.

Ratio $R1$ of the number of atoms of the first metal element to the total of the number of atoms of the first metal element and the number of atoms of the tungsten element in the first region is 0.70 time or more and less than 1.30 times as large as ratio $R2$ of the number of atoms of the first metal element to the total of the number of atoms of the first metal element and the number of atoms of the tungsten element in the second region. Thus, the toughness of the tungsten carbide grain can be increased, with the result that the cemented carbide including such a tungsten carbide grain can have excellent toughness. Further, $R1$ is preferably 0.75 time or more, and more preferably 0.8 time or more as large as $R2$. Further, $R1$ is preferably 1.25 times or less, and more preferably 1.2 times or less as large as $R2$. Further, $R1$ is preferably 0.75 time or more and 1.25 times or less, and more preferably 0.8 time or more and 1.2 times or less as large as $R2$.

$R1$ can also be represented by the following calculation formula: "$R1=$[(the number of atoms of the first metal element in the first region)/{(the number of atoms of the tungsten element in the first region)+(the number of atoms of the first metal element in the first region)}]×100". Further, $R2$ can also be represented by the following calculation formula: "$R2=$[(the number of atoms of the first metal element in the second region)/{(the number of atoms of the tungsten element in the second region)+(the number of atoms of the first metal element in the second region)}]×100". Further, the expression "$R1$ is 0.70 time or more and less than 1.30 times as large as $R2$" can also be expressed as the following calculation formula:

$$\text{“}0.70 \leq R1/R2 < 1.30\text{”}.$$

$R2$ is 2.0% or more and 10.0% or less. Accordingly, lattice strain is generated in the cemented carbide, thereby improving the toughness of the cemented carbide. $R2$ is preferably 3.0% or more, is more preferably 3.5% or more, and is further preferably 4.0% or more. $R2$ is preferably 8.0% or less, is more preferably 7.0% or less, and is further preferably 6.0% or less. $R2$ is preferably 3.0% or more and 8.0% or less, is more preferably 3.5% or more and 7.0% or less, and is further preferably 4.0% or more and 6.0% or less.

$R1$ is preferably 2.6% or more and 12% or less. Accordingly, lattice strain is generated in the cemented carbide, thereby further improving the toughness of the cemented carbide. Further, $R1$ is preferably 2.8% or more, and is more preferably 3.0% or more. Further, $R1$ is preferably 12.8% or less, and is more preferably 12.5% or less. Further, $R1$ is preferably 2.8% or more and 12.8% or less, and is more preferably 3.0% or more and 12.5% or less.

(Method of Measuring Each of $R1$ and $R2$)

A method of specifying each of $R1$ and $R2$ of each tungsten carbide grain is as follows in (A2) to (G2).

(A2) A sample is taken from the cemented carbide, and the sample is sliced to have a thickness of 30 to 100 nm by using an argon ion slicer ("IB09060CIS" (trademark) provided by JEOL) under a condition of an acceleration voltage of 2 kV, thereby producing a cut piece.

(B2) Next, a TEM (Transmission Electron Microscopy) (JFM-ARM300F (trademark) provided by JEOL) is used to observe the cut piece at a magnification of 200,000× under a condition of an acceleration voltage of 200 V, thereby obtaining a first image (not shown).

(C2) A surface S of a tungsten carbide grain is arbitrarily selected in the first image. It should be noted that a method of specifying surface S of the tungsten carbide grain in the first image is as follows. That is, an element mapping analysis by EDX (Energy Dispersive X-ray Spectroscopy) is performed onto the first image to analyze a distribution of cobalt. In the obtained element mapping image, a line indicating a region having a high cobalt concentration corresponds to surface S of the tungsten carbide grain.

(D2) Next, one tungsten carbide grain in the first image is arbitrarily selected, and a region (first region) of 0 nm or more and 50 nm or less from surface S of the tungsten carbide grain and a portion (second region) other than the first region in the tungsten carbide grain are specified using the image processing software (OpenCV, SciPy). A line segment L extending across the tungsten carbide grain is drawn in the first image. Line segment L is a line segment that connects between two points on surface S of the tungsten carbide, and passes through both the first region and the second region. It has been confirmed that line segment L does not affect below-described measurement results as long as it passes through both the first region and the second region.

Figure 2:
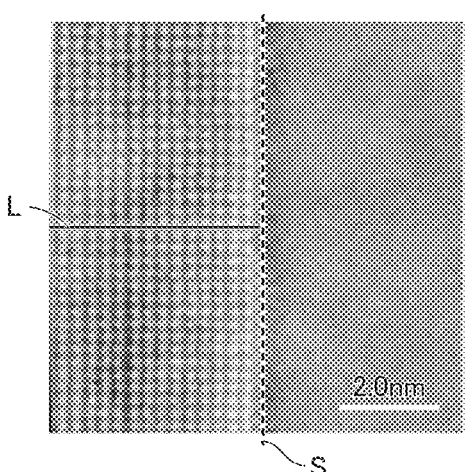
FIG. 2 shows a HAADF (high-angle annular dark field) image of a cross section of the cemented carbide of one embodiment of the present disclosure.

(E2) Positioning is performed such that line segment L extending across the tungsten carbide grain passes through the vicinity of the center of the image, the observation magnification is changed to 25,000,000×, and observation is performed, thereby obtaining a second image. When the length of line segment L is long and line segment L is not included in the visual field of one second image, a plurality of continuous second images (HAADF images) are obtained to include the whole of line segment L therein. FIG. 2 shows an example of the second image. It is understandable that in the second image, line segment L is located to pass through the vicinity of the center of the image, and that different tungsten carbide grains exist on the left side and on the right side in the plane of sheet with surface S of the tungsten carbide grain as a boundary. In the second image of FIG. 2, the tungsten carbide grain on the left side in the plane of sheet with S as a boundary is subjected to the following elemental line analysis.

Next, in the second image, the elemental line analysis by EDX is performed along the line segment to analyze the distribution of the first metal element and the distribution of the tungsten element. On this occasion, a beam diameter is set to 0.3 nm or less, and a scan interval is set to 0.1 to 0.7 nm. Thus, the element line analysis can be performed in a region from one point on the surface of the tungsten carbide grain to one point on the surface on the opposite side.

(F2) In accordance with the result of the element line analysis, the average value of the number of atoms of the first metal element and the average value of the number of atoms of the tungsten element are found in the region (first region) of 0 nm or more and 50 nm or less from the surface of the tungsten carbide grain.

Next, R1 is calculated by multiplying, by 100, a value obtained by dividing the average value of the number of atoms of the first metal element by the total of the found average value of the number of atoms of the first metal element and the found average value of the number of atoms of the tungsten element.

(G2) Further, in accordance with the result of the element line analysis, the average value of the number of atoms of the first metal element and the average value of the number of atoms of the tungsten element are found in the portion (second region) of the tungsten carbide grain other than the first region. Next, R2 is calculated by multiplying, by 100, a value obtained by dividing the average value of the number of atoms of the first metal element by the total of the found average value of the number of atoms of the first metal element and the found average value of the number of atoms of the tungsten element.

(Average Grain Size)

The lower limit of the average grain size of the tungsten carbide grains in the present embodiment is preferably 0.1 μm or more, 0.2 μm or more, or 0.3 μm or more. The upper limit of the average grain size of the tungsten carbide grains is preferably 3.5 μm or less, 3.0 μm or less, or 2.5 μm or less. The average grain size of the tungsten carbide grains is preferably 0.1 μm or more and 3.5 μm or less, 0.2 μm or more and 3.5 μm or less, 0.3 μm or more and 3.5 μm or less, 0.1 μm or more and 3.0 μm or less, 0.2 μm or more and 3.0 μm or less, 0.3 μm or more and 3.0 μm or less, 0.1 μm or more and 2.5 μm or less, 0.2 μm or more and 2.5 μm or less, or 0.3 μm or more and 2.5 μm or less. According to this, the cemented carbide has high hardness, and wear resistance of a tool including the cemented carbide is improved. Further, the tool can have excellent fracture resistance.

In the present specification, the average grain size of the tungsten carbide grains refers to D50 of the equal-area equivalent circle diameters (Heywood diameters) of the WC grains included in the cemented carbide (median diameter D50, which is an equivalent circle diameter corresponding to a number-based cumulative frequency of 50%). A method of measuring the average grain size of the tungsten carbide grains is as follows.

(A3) The region with existence of the tungsten carbide grains is specified on the image having been through the binarization process in the same manner as (A1) to (F1) in the method of measuring each of the content ratio of the tungsten carbide grains of the cemented carbide, and the content ratio of the binder phase.

(B3) One measurement visual field having a quadrangular shape of 24.9 μm×18.8 μm is set in the image having been through the binarization process. By using the image analysis software, the outer edge of each tungsten carbide grain in the measurement visual field is specified, and the equivalent circle diameter (Heywood diameter: equal-area equivalent circle diameter) of each tungsten carbide grain is calculated.

(C3) D50 of the equal-area equivalent circle diameters of the tungsten carbide grains is calculated based on all the tungsten carbide grains in the measurement visual field.

In the measurement performed by the applicant, as long as the measurement is performed onto the same sample, it has been confirmed that: variation is small in measurement results even when the position at which the cemented carbide is cut to obtain the cross section is set arbitrarily, the region to be captured in the image as described above in (C1) is set arbitrarily on the cross section, the measurement visual field described in (B2) is arbitrarily set, and the average grain size of the tungsten carbide grains is measured multiple times in accordance with the above-described procedure; and the measurement results are not intentional even when the position at which the cemented carbide is cut to obtain the cross section is arbitrarily set, the region to be captured in the image is arbitrarily set, and the measurement visual field is arbitrarily set.

(Elastic Modulus of Tungsten Carbide Grain)

The elastic modulus of the tungsten carbide grain is preferably 450 GPa or more and 465 GPa or less. In the cemented carbide, the elastic modulus of the tungsten carbide grain can be specified by the following method. First, the tungsten carbide grains are exposed by polishing the surface of the cemented carbide using a cross session polisher (CP) processing device ("IB-19500CP Cross Section Polisher" (trademark) provided by JEOL). Next, the elastic modulus of any one tungsten carbide grain is measured using a nano indenter ("TI980" (trademark) provided by Bruker Hysitron) under the following measurement conditions.

(Measurement Conditions for Nano Indenter)

Maximum load: 3 mN

Loading: 5 s

Holding: 2 s

Unloading: 5 s

N: 10

Similarly, the elastic modulus of each of any other nine tungsten carbide grains is measured. Next, the average value of the measured elastic moduli of the ten tungsten carbide grains is calculated, thereby finding the elastic modulus of the tungsten carbide grain.

The binder phase includes cobalt. Thus, excellent toughness can be provided to the cemented carbide. It should be noted that the content ratio of cobalt of the binder phase is preferably 90 mass % or more and 100 mass % or less, 92 mass % or more and 100 mass % or less, 94 mass % or more and 100 mass % or less, or 100 mass %. The content ratio of cobalt of the binder phase is measured by ICP (Inductively Coupled Plasma) emission spectroscopy (measurement device: "ICPS-8100" (trademark) provided by Shimadzu Corporation). It should be noted that as long as a detectable amount of cobalt by the ICP emission spectroscopy is included in the binder phase, the binder phase functions as a binder phase regardless of the content ratio of cobalt.

In addition to cobalt, the binder phase can include nickel (Ni), chromium (Cr), iron (Fe), aluminum (Al), ruthenium (Ru), rhenium (Re), or the like. The binder phase can be composed of cobalt and at least one selected from a group consisting of nickel, chromium, iron, aluminum, ruthenium, and rhenium. The binder phase can be composed of cobalt, at least one selected from the group consisting of nickel, chromium, iron, aluminum, ruthenium, and rhenium, and an inevitable impurity. Examples of the inevitable impurity include manganese (Mn), magnesium (Mg), calcium (Ca), molybdenum (Mo), sulfur (S), titanium (Ti), and the like.

<Content Ratio of Vanadium Based on Number of Atoms in Cemented Carbide>

The content ratio of vanadium based on the number of atoms in the cemented carbide is preferably 1.0 atm % or less. Thus, grain boundary strength between the tungsten carbide grains can be suppressed from being decreased due to vanadium. Further, the upper limit of the content ratio of vanadium based on the number of atoms in the cemented carbide is more preferably 0.8 atm % or less, and is further preferably 0.6 atm % or less. The lower limit of the content ratio of vanadium based on the number of atoms in the cemented carbide can be 0.1 atm % or more, 0.2 atm % or more, or 0.3 atm % or more from the viewpoint of manufacturing. Further, the content ratio of vanadium based on the number of atoms in the cemented carbide is preferably 0 atm % or more and 1.0 atm % or less, is more preferably 0 atm % or more and 0.8 atm % or less, and is further preferably 0 atm % or more and 0.6 atm % or less. It should be noted that vanadium exists at an interface between the tungsten carbide grains.

The content ratio of vanadium based on the number of atoms in the cemented carbide is measured by the ICP (Inductively Coupled Plasma) emission spectroscopy (measurement device: "ICPS-8100" (trademark) provided by Shimadzu Corporation).

Second Embodiment: Method of Manufacturing Cemented Carbide

The cemented carbide material of the present embodiment can be manufactured by performing a preparation step for source material powders, a mixing step, a molding step, a sintering step, and a cooling step in this order. Hereinafter, each step will be described.

<Pre-Process Step>

A pre-process step is a step of obtaining a tungsten carbide (WC) powder containing the first metal element. First, 75 mass % or more and 97 mass % or less of a metal tungsten (W) powder, 0.1 mass % or more and 10 mass % or less of a first metal element powder, and 3 mass % or more and 15 mass % or less of a carbon (C) powder are mixed to obtain a mixture. Examples of the first metal element powder include titanium oxide ($TiO_2$), a niobium oxide ($Nb_2O_5$) powder, and tantalum oxide ($Ta_2O_5$). Next, the mixture is heated at 1500° C. for 4 hours, thereby obtaining the tungsten carbide powder containing the first metal element (hereinafter, also referred to as "first-metal-element-containing WC powder"). For each of the metal tungsten oxide (W) powder, the first metal element powder, and the carbon powder, a commercially available powder can be used.

<Preparation Step>

The preparation step is a step of preparing the source material powders for the materials included in the cemented carbide material. The source material powders include the first-metal-element-containing WC powder and a cobalt (Co) powder. The source material powders further include a chromium carbide ($Cr_3C_2$) powder and a vanadium carbide (VC) powder, which are grain growth inhibitors. For each of the cobalt powder, the chromium carbide powder, and the vanadium carbide powder, a commercially available powder can be used.

<Mixing Step>

The mixing step is a step of mixing the source material powders prepared in the preparation step at a predetermined ratio. With the mixing step, a powder mixture is obtained by mixing the source material powders.

The ratio of the first-metal-element-containing WC powder in the powder mixture can be, for example, 80 mass % or more and 99.9 mass % or less. The ratio of the cobalt powder in the powder mixture can be, for example, 0.1 mass % or more and 20 mass % or less. The ratio of the chromium carbide powder in the powder mixture can be, for example, 0.1 mass % or more and 2 mass % or less. The ratio of the vanadium carbide powder in the powder mixture can be, for example, 0.1 mass % or more and 2 mass % or less.

For the mixing of the source material powders, a wet type bead mill ("LMZ06" (trademark) provided by Ashizawa Finetech) can be used. A mixing time can be 2 hours or more and 20 hours or less. With these, it is possible to finely crush and pulverize the source material powders.

It should be noted that after the mixing step, the powder mixture may be granulated as necessary. By granulating the powder mixture, the powder mixture can be readily introduced into a die or mold in the molding step described later. For the granulation, a known granulation method can be applied, and a commercially available granulator such as a spray dryer can be used, for example.

<Molding Step>

The molding step is a step of molding the powder mixture obtained in the mixing step into a shape of a rotating tool (such as a round bar shape), thereby obtaining a molded material. For molding method and molding conditions in the molding step, general method and conditions may be employed without a particular restriction.

<Sintering Step>

The sintering step is a step of sintering, by a sintering HIP (Hot Isostatic Pressing) process with which pressure can be applied during sintering, the molded material obtained through the molding step, thereby obtaining a cemented carbide intermediate material.

The sintering temperature is preferably 1320° C. or more and 1500° C. or less, is more preferably 1330° C. or more and 1450° C. or less, and is further preferably 1340° C. or more and 1420° C. or less.

A sintering time is preferably 30 minutes or more and 120 minutes or less, and is more preferably 45 minutes or more and 90 minutes or less.

A degree of vacuum (pressure) during the sintering is preferably 0.1 kPa or more and 10 MPa or less.

It should be noted that an atmosphere during the sintering is not particularly limited, and examples of the atmosphere include an $N_2$ gas atmosphere or an inert gas atmosphere such as Ar.

<Cooling Step>

The cooling step is a step of cooling the cemented carbide intermediate material having been through the sintering step. For example, the cemented carbide intermediate material can be quenched to 1000° C. in an Ar gas.

<Features of Method of Manufacturing Cemented Carbide According to the Present Embodiment>

In the cemented carbide obtained by the above-described manufacturing method, ratio R1 of the number of atoms of the first metal element to the total of the number of atoms of the first metal element and the number of atoms of the tungsten element in the first region is 0.70 time or more and less than 1.30 times as large as ratio R2 of the number of atoms of the first metal element to the total of the number of atoms of the first metal element and the number of atoms of the tungsten element in the second region, and ratio R2 is 2.0% or more and 10.0% or less. A reason therefor is presumed as follows.

By preparing the first metal element powder serving as a source material of the first metal element, the first metal element can be included in the cemented carbide. However, when the source material powder is simply mixed and sintered, the first metal element tends to be less likely to be diffused in each tungsten carbide grain included in the cemented carbide. On the other hand, the diffusion of the first metal element in the tungsten carbide grain is readily facilitated by performing the combination of obtaining the tungsten carbide powder containing the first metal element in advance in the pre-process step, strongly pulverizing the powder mixture using a bead mill in the mixing step, and performing sintering at a low temperature under application of pressure in the sintering step, with the result that the first metal element is likely to be diffused into the tungsten carbide grain included in the cemented carbide.

As a result of diligent study by the present inventors, it has been newly found that by performing the combination of obtaining the tungsten carbide powder containing the first metal element in advance in the pre-process step, using a bead mill in the mixing step, and performing sintering at a low temperature under application of pressure in the sintering step, it is possible to obtain the cemented carbide in which "ratio R1 of the number of atoms of the first metal element to the total of the number of atoms of the first metal element and the number of atoms of the tungsten element in the first region is 0.70 time or more and less than 1.30 times as large as ratio R2 of the number of atoms of the first metal element to the total of the number of atoms of the first metal element and the number of atoms of the tungsten element in the second region, and R2 is 2.0% or more and 10.0% or less".

<Tool>

The cemented carbide of the present embodiment can be used as a tool material. Examples of the tool include a cutting bite, a drill, an end mill, an indexable cutting insert for milling, an indexable cutting insert for turning, a metal saw, a gear cutting tool, a reamer, a tap, or the like.

The cemented carbide of the present embodiment may constitute a whole or part of each of these tools. Here, the expression "constitutes a part" represents an implementation, etc., in which the cemented carbide of the present embodiment is brazed to a predetermined position of any substrate so as to serve as a cutting edge portion.

The tool may further include a hard film that covers at least a portion of a surface of the substrate composed of the cemented carbide. As the hard film, for example, diamond-like carbon or diamond can be used.

EXAMPLES

The present embodiment will be described more specifically with reference to examples. However, the present embodiment is not limited by these examples.

<<Production of Cemented Carbide>>

A cemented carbide of each sample was produced in the following procedure.

<Pre-Process Step>

In order to produce each of cemented carbides of samples 1 to 16, a metal tungsten (W) powder ("A20" (trademark) provided by A.L.M.T Corp.), a titanium oxide ($TiO_2$) powder (first metal element powder), a niobium oxide ($Nb_2O_5$) powder (first metal element powder), a tantalum oxide ($Ta_2O_5$) powder (first metal element powder), and a carbon powder, which are the source material powders, were mixed at a composition shown in Table 1 so as to obtain a mixture. Next, the mixture was heated at 1500° C. for 4 hours to obtain a tungsten carbide powder containing the first metal element.

<Preparation Step>

In order to produce the cemented carbides of samples 1 to 16 and samples 101 to 108, the first-metal-element-containing WC powder, a cobalt (Co) powder, a chromium carbide ($Cr_3C_2$) powder, a vanadium carbide (VC) powder, a tungsten carbide (WC) powder not containing the first metal element (hereinafter also referred to as "WC (with no first metal element)") ("WC04NR" (trade name) provided by A.L.M.T. Corp.), and a titanium carbide (TiCN) powder were prepared as source material powders.

TABLE 1

| Sample No. | W [Mass %] | $TiO_2$ [Mass %] | $Nb_2O_5$ [Mass %] | $Ta_2O_5$ [Mass %] | C [Mass %] |
|---|---|---|---|---|---|
| Sample A | Remainder | 1.24 | — | — | 9 |
| Sample B | Remainder | 1.17 | — | — | 8 |
| Sample C | Remainder | 1.14 | — | — | 8 |
| Sample D | Remainder | 1.15 | — | — | 8 |
| Sample E | Remainder | 1.41 | — | — | 10 |
| Sample F | Remainder | 1.13 | — | — | 8 |
| Sample G | Remainder | 1.41 | — | — | 9 |
| Sample H | Remainder | 1.36 | — | — | 8 |
| Sample I | Remainder | 1.40 | — | — | 9 |
| Sample J | Remainder | — | 1.24 | — | 12 |
| Sample K | Remainder | — | — | 1.30 | 14 |
| Sample L | Remainder | 1.19 | — | — | 7 |
| Sample M | Remainder | 1.21 | — | — | 7 |
| Sample N | Remainder | 1.18 | — | — | 7 |
| Sample O | Remainder | 1.23 | — | — | 7 |
| Sample P | Remainder | 1.15 | — | — | 7 |

<Mixing Step>

Next, the prepared source material powders were mixed in formulations shown in Table 2 using a bead mill for 12 hours, thereby producing a powder mixture.

TABLE 2

| | Mixing Step | | | | | | | Sintering Step (Sinter HIP Process) | | | |
|---|---|---|---|---|---|---|---|---|---|---|---|
| Sample No. | WC (with First Metal Element) [Mass %] | WC (with No First Metal Element) [Mass %] | Co [Mass %] | $TiO_2$ [Mass %] | TiCN [Mass %] | $Cr_3C_2$ [Mass %] | VC [Mass %] | Temperature [° C.] | Time [min] | Atmosphere | s-HIP Pressure [MPa] |
|---|---|---|---|---|---|---|---|---|---|---|---|
| Sample 1 | Remainder (Sample A) | — | 12 | — | — | 1 | — | 1330 | 60 | $N_2{\rightarrow}Ar$ | 7 |
| Sample 2 | Remainder (Sample B) | — | 12 | — | — | 1 | — | 1330 | 60 | $N_2{\rightarrow}Ar$ | 7 |
| Sample 3 | Remainder (Sample C) | — | 12 | — | — | 1 | — | 1330 | 60 | $N_2{\rightarrow}Ar$ | 7 |
| Sample 4 | Remainder (Sample D) | — | 12 | — | — | 1 | — | 1330 | 60 | $N_2{\rightarrow}Ar$ | 7 |
| Sample 5 | Remainder (Sample E) | — | 12 | — | — | 1 | — | 1330 | 60 | $N_2{\rightarrow}Ar$ | 7 |
| Sample 6 | Remainder (Sample F) | — | 12 | — | — | 1 | — | 1330 | 60 | $N_2{\rightarrow}Ar$ | 7 |
| Sample 7 | Remainder (Sample G) | — | 12 | — | — | 1 | — | 1330 | 60 | $N_2{\rightarrow}Ar$ | 7 |
| Sample 8 | Remainder (Sample H) | | 12 | — | — | 1 | 0.5 | 1330 | 60 | $N_2{\rightarrow}Ar$ | 7 |
| Sample 9 | Remainder (Sample I) | — | 0.1 | — | — | 1 | — | 1330 | 60 | $N_2{\rightarrow}Ar$ | 7 |
| Sample 10 | Remainder (Sample J) | — | 12 | — | — | 1 | — | 1330 | 60 | $N_2{\rightarrow}Ar$ | 7 |
| Sample 11 | Remainder (Sample K) | — | 12 | — | — | 1 | — | 1330 | 60 | $N_2{\rightarrow}Ar$ | 7 |
| Sample 12 | Remainder (Sample L) | — | 0.1 | — | — | 1 | — | 1330 | 60 | $N_2{\rightarrow}Ar$ | 7 |
| Sample 13 | Remainder (Sample M) | — | 20 | — | — | 1 | — | 1330 | 60 | $N_2{\rightarrow}Ar$ | 7 |
| Sample 14 | Remainder (Sample N) | — | 12 | — | — | 1 | — | 1330 | 60 | $N_2{\rightarrow}Ar$ | 7 |
| Sample 15 | Remainder (Sample O) | — | 12 | — | — | 1 | — | 1330 | 60 | $N_2{\rightarrow}Ar$ | 7 |
| Sample 16 | Remainder (Sample P) | — | 12 | — | — | 1 | — | 1330 | 60 | $N_2{\rightarrow}Ar$ | 7 |

TABLE 2-continued

| | Mixing Step | | | | | | | Sintering Step (Sinter HIP Process) | | | |
|---|---|---|---|---|---|---|---|---|---|---|---|
| | | WC (with No | | | | | | | | | s-HIP |
| | WC (with First Metal Element) | First Metal Element) | Co [Mass | TiO₂ [Mass | TiCN [Mass | Cr₃C₂ [Mass | VC [Mass | Tempera- ture | Time | | Pressure |
| Sample No. | [Mass %] | [Mass %] | %] | %] | %] | %] | %] | [° C.] | [min] | Atmosphere | [MPa] |
| Sample 101 | — | Remainder | 12 | — | 1.03 | 1 | — | 1330 | 60 | N₂→Ar | 7 |
| Sample 102 | — | Remainder | 12 | 1.03 | — | 1 | — | 1330 | 60 | N₂→Ar | 7 |
| Sample 103 | — | Remainder | 0 | 1.14 | — | 1 | — | 1330 | 60 | N₂→Ar | 7 |
| Sample 104 | — | Remainder | 13 | 1.23 | — | 1 | — | 1330 | 60 | N₂→Ar | 7 |
| Sample 105 | — | Remainder | 12 | 1.10 | — | 1 | — | 1330 | 60 | N₂→Ar | 0.5 |
| Sample 106 | — | Remainder | 12 | 1.14 | — | 1 | — | 1330 | 60 | N₂→Ar | 0.5 |
| Sample 107 | — | Remainder | 12 | 1.18 | — | 1 | — | 1330 | 60 | N₂→Ar | 7 |
| Sample 108 | — | Remainder | 12 | 1.37 | — | 1 | — | 1330 | 60 | N₂→Ar | 7 |

<Molding Step>

Next, the obtained powder mixture was press-molded, thereby producing a molded material having a round bar shape.

<Sintering Step>

Next, a sinter HIP (sinter hip) process was performed under conditions shown in Table 2, thereby producing a cemented carbide intermediate material. It should be noted that the description "N₂→Ar" in Table 2 means that the atmosphere was changed from the N₂ gas (10 kPa) to the Ar gas (the pressure of the Ar gas is a pressure described in the column "s-HIP Pressure [MPa]" in Table 2).

<Cooling Step>

Then, the cemented carbide intermediate material having been through the sintering step was quenched to 1000° C. in the Ar gas.

With the above, each of the cemented carbides of samples 1 to 16 and the cemented carbides of samples 101 to 108 was produced. Each of the cemented carbides of samples 1 to 16 corresponds to an example of the present disclosure, and each of the cemented carbides of samples 101 to 108 corresponds to a comparative example.

<<Production of Cutting Tool>>

A round bar composed of each of the obtained cemented carbides was processed to produce an end mill (cutting tool) having a diameter φ of 3 mm.

<<Evaluation on Properties of Cemented Carbide>>

<Ratio of Total of Volume of Tungsten Carbide Grains and Volume of Binder Phase to Volume of Cemented Carbide>

For each of the cemented carbides of samples 1 to 16 and samples 101 to 108, the ratio of the total of the volume of the tungsten carbide grains and the volume of the binder phase to the volume of the cemented carbide was found by the method described in the first embodiment. Obtained results are shown in the column "WC Grains+Binder Phase [Volume %]" in Table 3.

TABLE 3

| Sample No. | First Metal Element | WC Grains + Binder Phase [Volume %] | Binder Phase [Volume %] | Co Content Ratio of Binder Phase [Mass %] | R1 [%] | R2 [%] | R1/ R2 | V Content Ratio [Atm %] | Average Grain Size of WC Grains [μm] | Cutting Test [m] |
|---|---|---|---|---|---|---|---|---|---|---|
| Sample 1 | Ti | 98.9 | 19.1 | 99.8 | 4.9 | 4.2 | 1.17 | 0 | 0.53 | 4.2 |
| Sample 2 | Ti | 99.0 | 19.1 | 99.7 | 2.9 | 3.8 | 0.76 | 0 | 0.65 | 3.9 |
| Sample 3 | Ti | 99.0 | 19.1 | 99.8 | 2.8 | 2.2 | 1.27 | 0 | 0.66 | 3.6 |
| Sample 4 | Ti | 99.0 | 19.1 | 99.9 | 2.8 | 2.7 | 1.04 | 0 | 0.66 | 3.9 |
| Sample 5 | Ti | 98.9 | 19.1 | 99.9 | 11.8 | 9.9 | 1.19 | 0 | 0.37 | 3.9 |
| Sample 6 | Ti | 99.0 | 19.1 | 99.8 | 2.4 | 2.3 | 1.04 | 0 | 0.70 | 3.9 |
| Sample 7 | Ti | 98.9 | 19.1 | 99.9 | 12.1 | 9.9 | 1.22 | 0 | 0.37 | 3.9 |
| Sample 8 | Ti | 98.9 | 19.1 | 99.8 | 9.0 | 9.4 | 0.96 | 1.2 | 0.42 | 3.9 |
| Sample 9 | Ti | 98.9 | 0.2 | 99.6 | 11.6 | 9.8 | 1.18 | 0 | 0.38 | 3.3 |
| Sample 10 | Nb | 98.9 | 19.1 | 99.8 | 5.0 | 4.4 | 1.14 | 0 | 0.53 | 3.9 |
| Sample 11 | Ta | 98.9 | 19.1 | 99.8 | 6.5 | 7.6 | 0.86 | 0 | 0.47 | 3.9 |
| Sample 12 | Ti | 98.9 | 0.1 | 99.5 | 11.2 | 9.2 | 1.22 | 0 | 0.38 | 3.3 |
| Sample 13 | Ti | 98.9 | 20 | 99.9 | 7.0 | 7.6 | 0.92 | 0 | 0.46 | 3.9 |
| Sample 14 | Ti | 99.0 | 19.1 | 99.8 | 2.4 | 2.0 | 1.20 | 0 | 0.70 | 3.3 |
| Sample 15 | Ti | 98.9 | 19.1 | 99.8 | 9.8 | 10.0 | 0.98 | 0 | 0.40 | 3.6 |
| Sample 16 | Ti | 98.9 | 19.1 | 99.8 | 5.0 | 7.1 | 0.70 | 0 | 0.53 | 3.6 |
| Sample 101 | Ti | 98.9 | 19.1 | 99.8 | 0 | 0 | — | 0 | 0.50 | 1.5 (Breakage) |
| Sample 102 | Ti | 99.0 | 19.1 | 99.9 | 1.2 | 1.6 | 0.75 | 0 | 0.93 | 2.4 (Breakage) |
| Sample 103 | Ti | 98.9 | 0 | — | 3.0 | 2.9 | 1.03 | 0 | 0.64 | 0.3 (Breakage at Initial Stage) |
| Sample 104 | Ti | 98.8 | 22.1 | 99.8 | 5.0 | 5.9 | 0.85 | 0 | 0.53 | 1.8 (Wear to Breakage) |

TABLE 3-continued

| Sample No. | First Metal Element | WC Grains + Binder Phase [Volume %] | Binder Phase [Volume %] | Co Content Ratio of Binder Phase [Mass %] | R1 [%] | R2 [%] | R1/ R2 | V Content Ratio [Atm %] | Average Grain Size of WC Grains [μm] | Cutting Test [m] |
|---|---|---|---|---|---|---|---|---|---|---|
| Sample 105 | Ti | 98.9 | 19.1 | 99.8 | 2.3 | 1.8 | 1.28 | 0 | 0.72 | 2.1 (Breakage) |
| Sample 106 | Ti | 98.9 | 19.1 | 99.9 | 2.7 | 4.0 | 0.68 | 0 | 0.67 | 2.1 (Breakage) |
| Sample 107 | Ti | 98.8 | 19.1 | 99.9 | 4.0 | 3.0 | 1.33 | 0 | 0.57 | 2.4 (Breakage) |
| Sample 108 | Ti | 98.6 | 19.1 | 99.7 | 12.2 | 10.9 | 1.12 | 0 | 0.37 | 2.1 (Breakage) |

<Ratio of Volume of Binder Phase to Volume of Cemented Carbide>

For each of the cemented carbides of samples 1 to 16 and samples 101 to 108, a ratio of the volume of the binder phase to the volume of the cemented carbide was found by the method described in the first embodiment. Obtained results are shown in the column "Binder Phase [Volume %]" in Table 3.

<Content Ratio of Cobalt in Binder Phase>

In each of the cemented carbides of samples 1 to 16, samples 101 to 102 and samples 104 to 108, the content ratio of cobalt of the binder phase was found by the method described in the first embodiment. Obtained results are described in the column "Co Content Ratio of Binder Phase [Mass %]" in Table 3.

<R1 and R2, R1/R2>

R1 of each of the cemented carbides of samples 1 to 16 and samples 101 to 108 was found by the method described in the first embodiment. Obtained results are shown in the column "R1 [%]" in Table 3. R2 of each of the cemented carbides of samples 1 to 16 and samples 101 to 108 was found by the method described in the first embodiment. Obtained results are shown in the column "R2 [%]" in Table 3. R1/R2 was calculated based on obtained R1 and R2. Results are shown in the column "R1/R2" in Table 3.

<Average Grain Size of Tungsten Carbide Grains>

The average grain size of the tungsten carbide grains of each of the cemented carbides of samples 1 to 16 and samples 101 to 108 was found by the method described in the first embodiment. Obtained results are shown in the column "Average Grain Size of WC Grains [μm]" in Table 3.

<Content Ratio of Vanadium of Cemented Carbide Based on Number of Atoms>

For each of the cemented carbides of samples 1 to 16 and samples 101 to 108, the content ratio of vanadium based on the number of atoms in the cemented carbide was found by the method described in the first embodiment. Obtained results are shown in the column "V Content Ratio [Atm %]" in Table 3.

<Elastic Modulus of Tungsten Carbide Grain>

The elastic modulus of each of the cemented carbides of sample 1 and sample 101 was found by the method described in the first embodiment. The elastic modulus of the WC grain of sample 1 was 465 GPa. The elastic modulus of the WC grain of sample 101 was 449 GPa. In each of the cemented carbides of samples 2 to 12, it was confirmed that the elastic modulus of the tungsten carbide grain was 450 GPa or more. In the cemented carbides of samples 102 to 108, it was confirmed that the elastic modulus of the tungsten carbide grain was less than 450 GPa.

<Cutting Test>

An end mill of each sample was used to perform cutting under the following cutting conditions so as to measure a cutting distance until breakage of 100 μm or more occurred in the end mill. The following cutting conditions correspond to an end milling process (high-efficiency process) on a titanium alloy. A longer cutting distance indicates a longer tool life. Obtained results are shown in the column "Cutting Test [m]" in Table 3.

(Cutting Conditions)

Workpiece: Inconel aged material (φ10-hole-provided material)

Cutting speed Vc: 40 m/min

Feed Fz per cutting edge: 0.1 mm/t

Cut-in depth Ap: 1.0 mm

Cutting width Ae: 0.5 mm

Cutting fluid: Present (Wet)

Review

Each of the end mills (cutting tools) of the cemented carbides of samples 1 to 16 corresponds to an example of the present disclosure. Each of the end mills (cutting tools) of the cemented carbides of samples 101 to 108 corresponds to a comparative example. It was confirmed that each of the end mills (cutting tools) (examples of the present disclosure) of the cemented carbides of samples 1 to 16 has a longer tool life than that of each of the end mills (cutting tools) (comparative examples) of the cemented carbides of samples 101 to 108 particularly in the end milling process (intermittent process) on steel, titanium, Inconel, or the like.

Heretofore, the embodiments and examples of the present disclosure have been illustrated, but it has been initially expected to appropriately combine the configurations of the embodiments and examples and modify them in various manners.

The embodiments and examples disclosed herein are illustrative and non-restrictive in any respect. The scope of the present invention is defined by the terms of the claims, rather than the embodiments and examples described above, and is intended to include any modifications within the scope and meaning equivalent to the terms of the claims.

REFERENCE SIGNS LIST

1: tungsten carbide grain; 2: binder phase; 3: cemented carbide; R1: ratio of the number of atoms of a first metal element to a total of the number of atoms of the first metal element and the number of atoms of a tungsten element in a first region; R2: ratio of the number of atoms of the first metal element to a total of the number of atoms of the first metal element and the number of atoms of the tungsten element in a second region; L: line segment extending across a tungsten carbide grain; S: surface of a tungsten carbide grain.

The invention claimed is:

1. A cemented carbide comprising a tungsten carbide grain and a binder phase, wherein the cemented carbide includes 80 volume % or more of the tungsten carbide grain and the binder phase in total, the cemented carbide includes 0.1 volume % or more and 20 volume % or less of the binder phase, the tungsten carbide grain is composed of a first region and a second region, the first region is a region of 0 nm or more and 50 nm or less from a surface of the tungsten carbide grain, the second region is a portion of the tungsten carbide grain other than the first region, each of the first region and the second region includes a first metal element, the first metal element is at least one selected from a group consisting of titanium, niobium, and tantalum, a ratio R1 of the number of atoms of the first metal element to a total of the number of atoms of the first metal element and the number of atoms of a tungsten element in the first region is 0.70 time or more and less than 1.30 times as large as a ratio R2 of the number of atoms of the first metal element to a total of the number of atoms of the first metal element and the number of atoms of the tungsten element in the second region, the R2 is 2.0% or more and 10.0% or less, and the binder phase includes cobalt.

2. The cemented carbide according to claim 1, wherein the R1 is 0.75 time or more and 1.25 times or less as large as the R2.

3. The cemented carbide according to claim 1, wherein the R2 is 3.0% or more and 8.0% or less.

4. The cemented carbide according to claim 1, wherein the R1 is 2.6% or more and 12% or less.

5. The cemented carbide according to claim 1, wherein a content ratio of vanadium in the cemented carbide based on the number of atoms is 1.0 atm % or less.

6. The cemented carbide according to claim 1, wherein the R1 is 2.8% or more and 11.8% or less.

7. The cemented carbide according to claim 1, wherein a content ratio of vanadium in the cemented carbide based on the number of atoms is 0.8 atm % or less.

8. The cemented carbide according to claim 1, wherein the R1 is 0.8 time or more and 1.2 times or less as large as the R2.

9. The cemented carbide according to claim 1, wherein an average grain size of the tungsten carbide grains is 0.1 μm or more and 3.5 μm or less.

10. The cemented carbide according to claim 1, wherein an elastic modulus of the tungsten carbide grain is 450 GPa or more and 465 GPa or less.

11. The cemented carbide according to claim 1, wherein the content ratio of cobalt of the binder phase is 90 mass % or more and 100 mass % or less.

* * * * *